(12) United States Patent
Bailey (10) Patent No.: US 7,779,989 B2
(45) Date of Patent: Aug. 24, 2010

(54) ADJUSTABLE WOOD CHIP FLINGER

(75) Inventor: Kenneth F. Bailey, Apex, NC (US)

(73) Assignee: Bailey Consulting, Inc., Cary, NC (US)

(*) Notice: Subject to any disclaimer, the term of this patent is extended or adjusted under 35 U.S.C. 154(b) by 260 days.

(21) Appl. No.: 12/045,068

(22) Filed: Mar. 10, 2008

(65) Prior Publication Data

US 2008/0223488 A1 Sep. 18, 2008

Related U.S. Application Data (60) Provisional application No. 60/894,510, filed on Mar. 13, 2007, provisional application No. 60/986,758, filed on Nov. 9, 2007, provisional application No. 60/909,762, filed on Apr. 3, 2007, provisional application No. 61/034,551, filed on Mar. 7, 2008, provisional application No. 60/909,822, filed on Apr. 3, 2007.

(51) Int. Cl.
*B65G 31/04* (2006.01)

(52) U.S. Cl. .............. 198/642; 144/329; 414/301; 414/332

(58) Field of Classification Search .......... 144/329; 198/642; 414/301, 332, 339, 398, 293; 141/286
See application file for complete search history.

(56) References Cited

U.S. PATENT DOCUMENTS

| | | | |
|---|---|---|---|
| 627,906 A | 6/1899 | Andridge | |
| 1,300,800 A | 4/1919 | Wood | |
| 1,457,113 A | 5/1923 | Langworthy | |
| 1,691,683 A * | 11/1928 | Townsend | 198/641 |
| 2,239,448 A | 4/1941 | Selhorst | |
| 2,788,115 A * | 4/1957 | Friedman | 414/301 |
| 2,834,483 A | 5/1958 | Friedman | |
| 2,845,190 A * | 7/1958 | Creuzburg | 414/296 |
| 2,970,782 A * | 2/1961 | Fleissner | 241/279 |
| 3,191,783 A * | 6/1965 | Henderson | 414/300 |

(Continued)

FOREIGN PATENT DOCUMENTS

DE 102005027275 B3 10/2006

(Continued)

OTHER PUBLICATIONS

International Search Report (PCT/ISA/220) mailed Jul. 28, 2008.

*Primary Examiner*—Shelley Self
(74) *Attorney, Agent, or Firm*—Coats & Bennett, P.L.L.C.

(57) ABSTRACT

An assembly for processing wood chips has a rotatable drum with a plurality of blades circumferentially spaced from one another fed by a feed chute assembly. The feed chute assembly comprises a moveable element mounted so as to be dynamically moveable between a first position and a second position. The feed chute assembly may include a downwardly angled feed chute and a redirecting wall disposed downstream thereof. The moveable element may be all or part of either or both of the main chute and the redirecting wall. Wood chips are directed toward the rotating drum at a rotational position that varies depending on the position of the moveable element. The wood chips fed to the drum are flung therefrom in a pattern that varies in a side view along the axis depending on the position of the element. There may be multiple moveable elements.

8 Claims, 7 Drawing Sheets

U.S. PATENT DOCUMENTS

| | | | |
|---|---|---|---|
| 3,195,711 A | | 7/1965 | Bogdan et al. |
| 3,643,819 A | * | 2/1972 | Halcomb ................... 414/293 |
| 4,479,428 A | * | 10/1984 | Krueger et al. ............. 100/210 |
| 4,820,108 A | * | 4/1989 | Kneer ......................... 414/301 |
| 5,184,714 A | * | 2/1993 | Tapp .......................... 198/641 |
| 5,316,429 A | * | 5/1994 | Connelly et al. ............ 414/298 |
| 5,348,434 A | * | 9/1994 | Peeples et al. .............. 414/301 |
| 5,393,189 A | * | 2/1995 | Berquist ..................... 414/301 |
| 5,735,319 A | * | 4/1998 | McNamara et al. ......... 141/286 |
| 6,109,312 A | | 8/2000 | Sawyer et al. |
| 6,213,289 B1 | * | 4/2001 | Hay et al. ................... 198/642 |
| 6,811,020 B2 | * | 11/2004 | Bailey ......................... 198/642 |
| 6,948,610 B2 | | 9/2005 | Connor et al. |
| 7,252,473 B2 | * | 8/2007 | Bailey ......................... 414/339 |
| 2002/0076308 A1 | * | 6/2002 | Bailey et al. ................ 414/301 |
| 2004/0045629 A1 | * | 3/2004 | Bailey ......................... 141/286 |
| 2006/0102664 A1 | | 5/2006 | Brashears et al. |
| 2008/0121308 A1 | * | 5/2008 | Bailey .................... 141/311 R |

FOREIGN PATENT DOCUMENTS

GB            2173682          10/1986

* cited by examiner

ADJUSTABLE WOOD CHIP FLINGER

This application claims the benefit of U.S. Provisional Application No. 60/894,510, filed 13 Mar. 2007; and U.S. Provisional Application No. 60/986,758, filed 9 Nov. 2007; and U.S. Provisional Application No. 60/909,762, filed 3 Apr. 2007; and U.S. Provisional Application No. 61/034,551, filed 7 Mar. 2008; and U.S. Provisional Application No. 60/909,822, filed 3 Apr. 2007; the entireties of which are incorporated herein by reference.

BACKGROUND OF THE INVENTION

The present invention relates generally to the field of wood chip processing, and more particularly to a machine and associated method for dense packing of wood chips for storage, transport, or further processing.

One major factor in the cost of wood chips for paper making is the cost of transporting the wood chips from the chip manufacturing site to the paper mill. The wood chips are typically transported in rail cars, but may also be transported in barges, trailers, or the like. Typically, the transportation costs are based primarily on the number of containers used to ship a given load of wood chips. Thus, the more densely containers can be packed, the lower the transportation costs for delivering a given amount of useable wood chips.

Space considerations are also relevant in the storage and processing of wood chips. For instance, the storage of wood chips on site, such as at a pulp mill, consumes space. As such, it is advantageous to have the wood chips densely packed when "stacking" the wood chips for storage.

While a number of wood chip handling techniques have been proposed in the industry, there remains a need for alternative wood chip handling techniques, particularly ones that allow for dense packing of the wood chips for storage and/or transport.

SUMMARY OF THE INVENTION

The present invention provides an assembly for processing wood chips that comprises a drum rotatable in a rotational direction about a generally horizontal longitudinal axis, the drum comprising a central core and at least first and second outwardly extending blades circumferentially spaced from one another. A feed chute assembly is disposed upstream from the drum and operative to feed wood chips to the drum. The feed chute assembly comprises a moveable element mounted so as to be dynamically moveable between a first position and a second position. That is, the element is mounted so as to be moveable while the drum is rotating and the wood chips are being fed to the drum. The element being in the first position causes associated wood chips to be directed toward a first rotational position relative to the drum; the element being in the second position causes associated wood chips to be directed toward a second rotational position relative to the drum. The second rotational position is located different from the first rotational position. The output pattern of wood chips flung from the drum varies in a side view along the axis depending on the position of the element. The feed chute assembly may comprise a downwardly angled main chute and a redirecting wall disposed downstream of the main chute, upstream of the drum, and disposed at an angle to the main chute. The moveable element may be a portion of either the main chute or the redirecting wall, and there may be multiple moveable elements. For example, the main chute may comprise first and second sections arranged to be parallel flow-wise, with the first section dynamically moveable independent of the second section.

In another aspect, the present invention provides a method of forming a stack of wood chips, in a container or otherwise, with increased density. The method comprises feeding a supply of wood chips to a rotating drum via a feed chute assembly; the drum rotating about a generally horizontal longitudinal axis and comprising a central core and at least first and second outwardly extending blades circumferentially spaced from one another. The method comprises changing an output configuration of the wood chips flung from the drum by moving at least a portion of at least one of the main chute and the directing wall from a first position to a second position while the drum is rotating and the wood chips are being fed to the drum. The moving causes an associated flow of wood chips to be directed at the drum at a different rotational position. The changing the output pattern step may comprise widening the output pattern, in a side view along the axis, and the method may further comprise thereafter adjusting the output pattern by moving the moved portion from the second position to the first position while the drum is rotating and the wood chips are being fed to the drum. If desired, the changing the output pattern may comprise moving at least a portion of both the main chute and the directing wall while the drum is rotating and the wood chips are being fed to the drum. The moving causes an angular sweep, in side view, of said wood chips flung by said drum to change by at least 50%, such as by narrowing by at least 75%.

Other aspects of the assembly and related methods are also evident from the following description and corresponding drawings.

DESCRIPTION OF THE PREFERRED EMBODIMENTS

Figure 1:
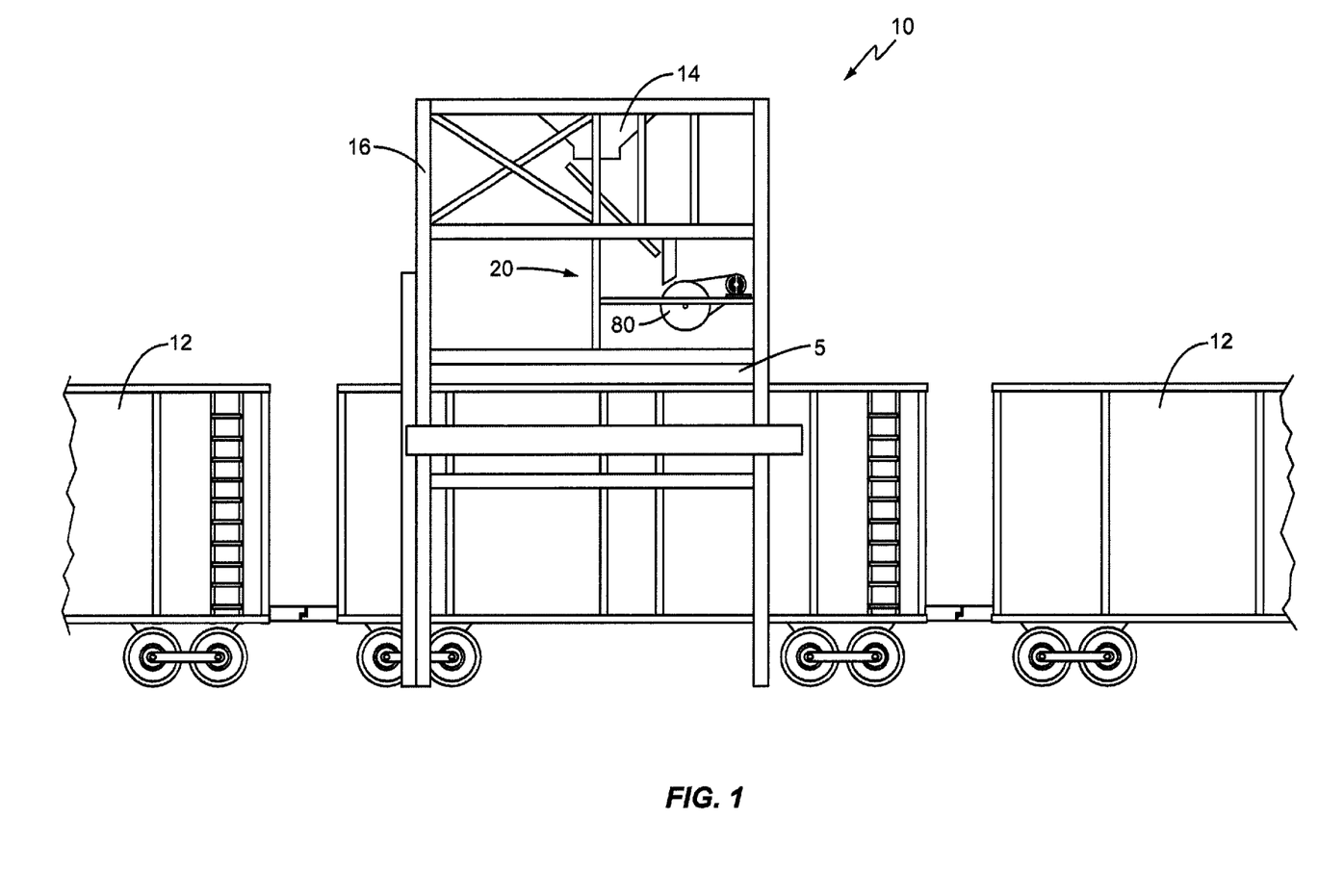
FIG. 1 shows one embodiment of the flinger device of the present invention employed in a wood chip loading station for filling railcars.

In order to provide a better understanding of the present invention, one or more embodiments of the wood chip handling device according to the present invention are shown in FIG. 1 in the context of a wood chip loading station 10 for filling railcars 12. The wood chip handling device, generally indicated at 20, is shown installed in a tower structure 16 that extends above a rail line with a railcar 12 thereon. Wood chips 5 are fed to the handling device 20 in the tower 16 by any suitable means, such as by conventional conveyor system 14 (only the output funnel of which is shown for clarity), or alternatively via a pneumatic means into a cyclone, or by other like means known in the art. While the input feed system (e.g., conveyor system 14) is shown with only one output, it should be understood that the input feed system may have multiple outputs, such as in a so-called "pants leg" bifurcated chute system known in the art. There may be a handling device 20 at each output, or at only one output, as is desired. The handling device 20 takes the input stream of wood chips from the conveyor 14 and directs it into the railcar 12 so that the wood chips 5 are packed in railcar 12. In most applications, the railcar 12 will be moved underneath the handling device 20 during the loading process so as to fill the entirety of the railcar's length, but the device 20 (with or without the tower 16) may alternatively be moved while the railcar 12 is held stationary, if desired.

The handling device 20, sometimes referred to herein as the "flinger," generally uses a rotating drum 80 to "fling" the wood chips into a packed pile that has a higher packing density than would be achieve with a free-fall of the chips. Some forms of rotating drum chip flingers are known in the art. See, for example, U.S. Pat. Nos. 6,811,020 and 7,252,473, and U.S. Patent Application Publication 2004/0045629, the disclosures of which are incorporated herein by reference in their entirety. In addition, the disclosure of U.S. patent application Ser. No. 11/563,445 is also incorporated herein in its entirety.

Figure 2:
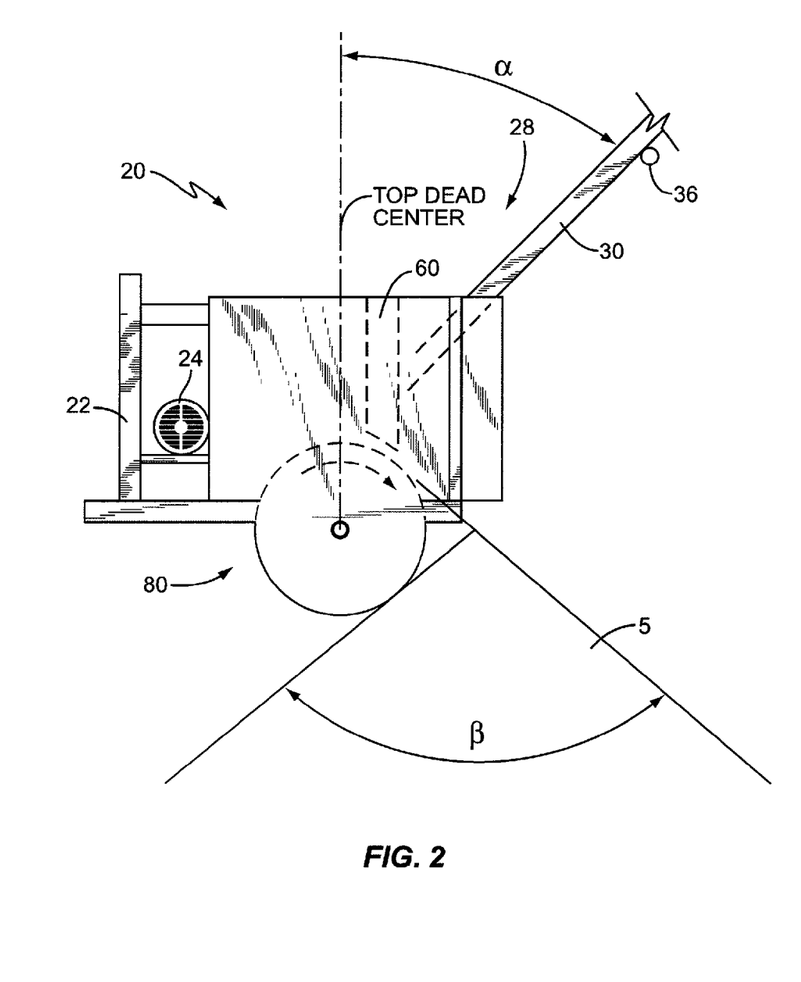
FIG. 2 shows a side view of one embodiment of the flinger device of the present invention.

As shown in FIG. 2, one embodiment of the handling device 20 may include a frame 22, a motor 24, a feed chute assembly 28, and a drum 80. The frame 22 supports the motor 24, feed chute assembly 28, and drum 80, and may take any suitable form known in the art, such as welded assembly of angle iron. The motor 24 supplies rotational power to the drum 80, typically via a pulley and belt arrangement (not shown in detail). The motor 24 may be of any type known in the art, but is typically an electric motor of approximately fifteen horsepower or more.

Figure 3A:
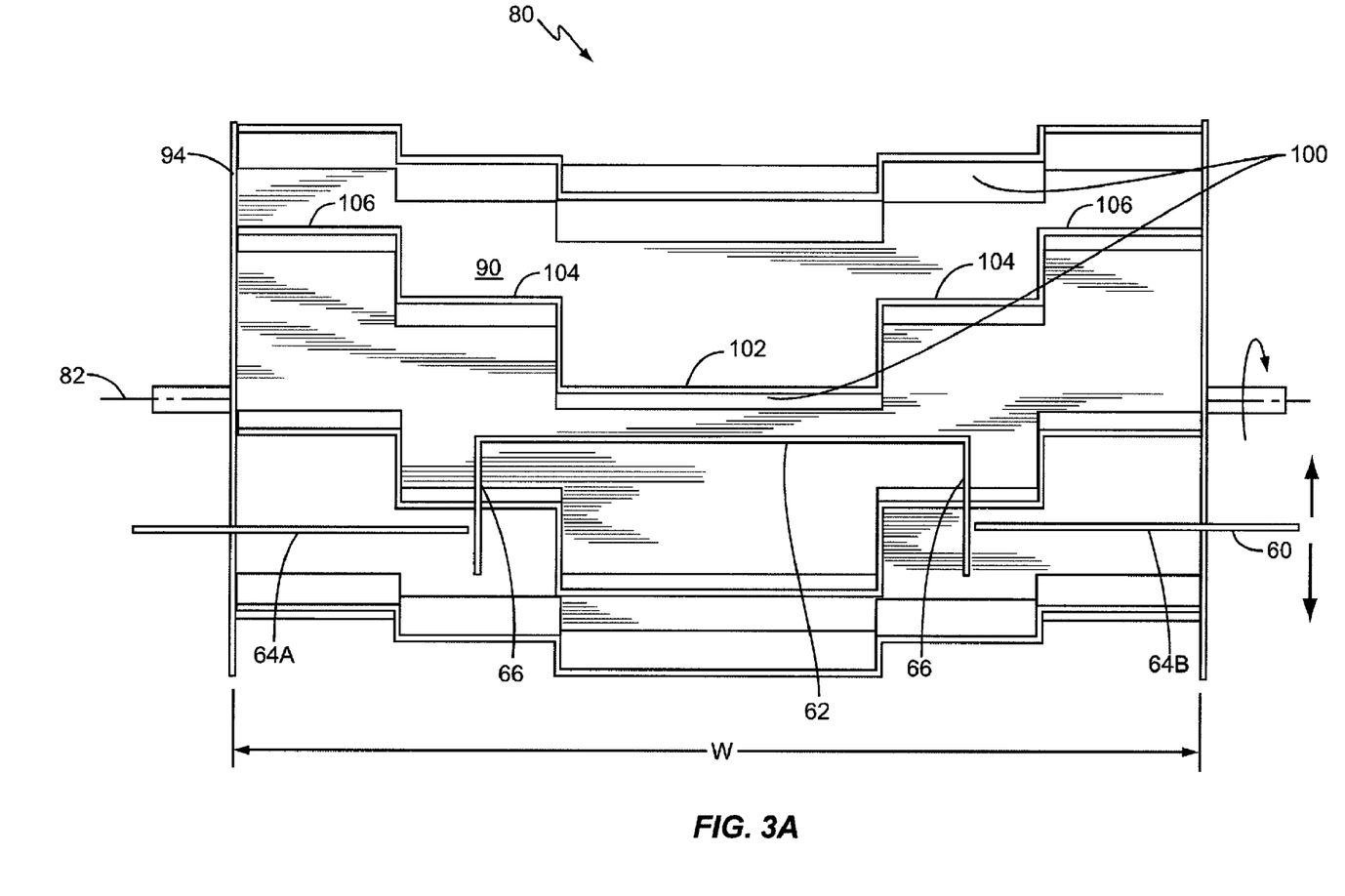
FIG. 3A shows a simplified top view of the drum and redirecting wall of one embodiment.
Figure 3B:
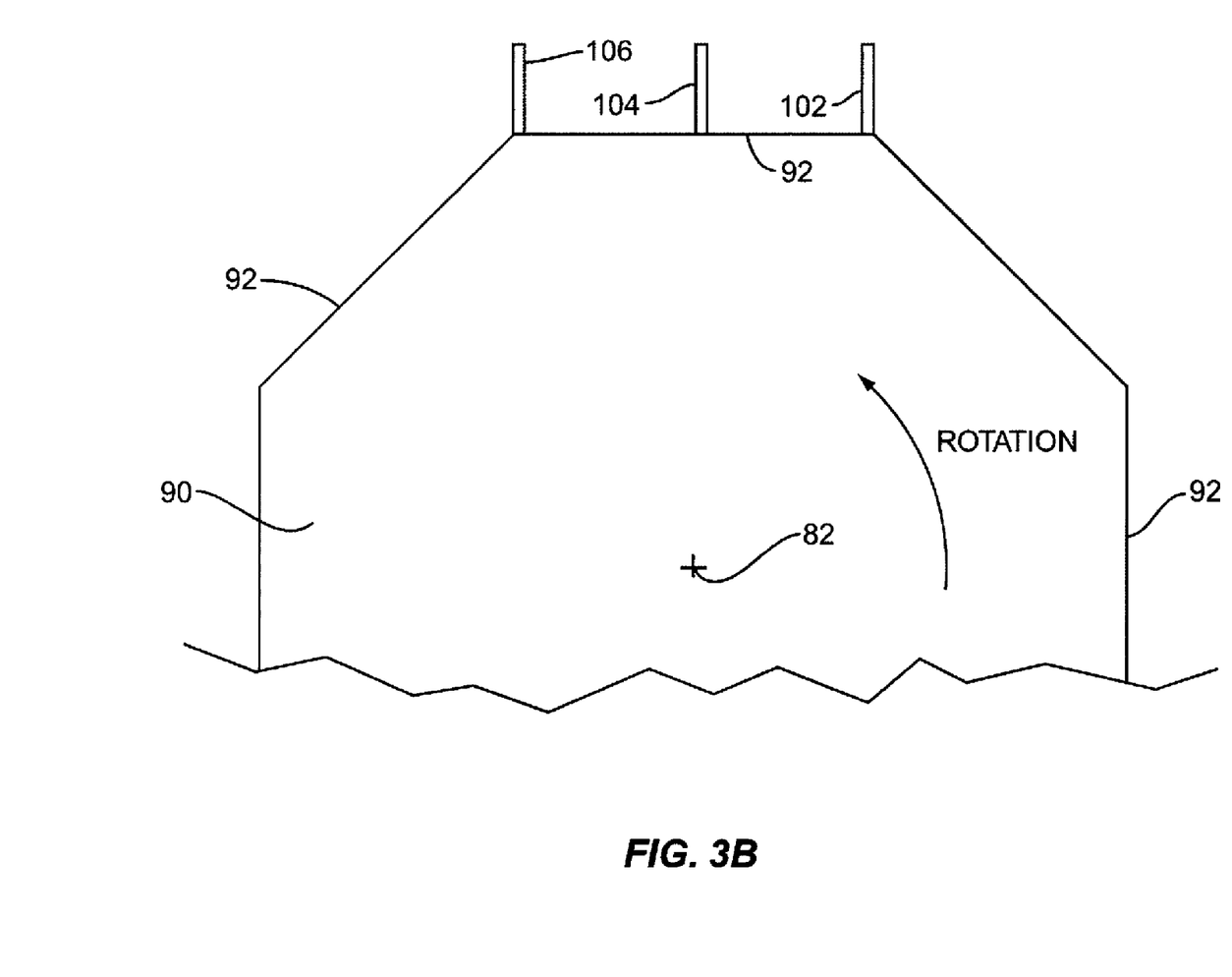
FIG. 3B shows a side view, perpendicular to the rotational axis, of the drum of FIG. 3A with drum endcaps and joining sections removed for clarity.

The drum 80 is mounted for rotation about a generally horizontal axis 82, and supported by the frame 22. The drum 80 may be mounted to an axle, which may be a central shaft or a pair of stub shafts, which is in turn supported by suitable bearings mounted to the frame 22. As indicated above, the axle should have a pulley, gear, or like means for accepting non-gravitational rotational power from motor 24 to turn the drum 80. The drum 80 includes a main body core 90 with a plurality of outwardly extending blades 100, and optionally a pair of lateral endcaps 94. The main body 90 of the drum 80 may have a circular cross-section, but preferably has a faceted cross-section, such as an octagonal cross-section. The blades 100 are mounted to the core 90 so as to extend away from the surface thereof; for instance, the blades 100 may extend generally perpendicular from the corresponding facet 92 forming the perimeter of the drum's core 90. The blades may take a variety of forms. For example, the blades may have a chevron profile, may have a stepped profile, and/or may have forwardly canted sections, or the like. In one embodiment, blade 100 has a stepped profile with a center section 102 of twelve inches, outboard sections 106 of ten inches, and intermediate sections 104 of eight inches, for an overall blade length W of forty-eight inches. In some embodiments, the center section 102, or one or more of the side sections 104, 106, may be angled forward or rearward, if desired. The speed of the incoming supply of wood chips, and/or the relative mounting height of the drum 80, and/or the desired angular sweep β of the output may help determine the amount and direction of angulation. In some embodiments, the relevant section may be angled forward by about 20°-60°, such as about 55°, relative to a line normal to the corresponding facet 92. While not required, the blades 100 are advantageously substantially uniform and extend from one lateral endcap 94 to the other.

For additional information regarding blade profiles, see U.S. Pat. No. 6,811,020; U.S. Pat. No. 7,252,473; U.S. Patent Application Publication 2004/0045629, and/or U.S. patent application Ser. No. 11/563,445.

Feed chute assembly 28 is disposed upstream of the drum 80, between the drum 80 and the conveyor system 14. The feed chute assembly 28 advantageously includes one or more moveable elements that are dynamically moveable. By dynamically moveable, it is meant that the relevant element is moveable while the overall device is operating with the drum 80 spinning. It is intended that the dynamic movement of the moveable element will cause the flow path 70 (path of center of relevant material flow) of the wood chips 5 moving therethrough to change to thereby cause the associated wood chips to be directed at the drum 80 at different rotational positions. It is believed that such an arrangement allows the output pattern of the wood chips being flung from the drum 80 to be varied in a controlled fashion, thereby allowing a greater utilization of the increased packing density provided by the flinger device 20.

In general, the feed chute assembly 28 may include a main chute 30 and a redirecting wall 60 disposed downstream of the main chute 30. Either or both of the main chute 30 and the redirecting wall 60 may have the moveable elements discussed above.

Figure 4:
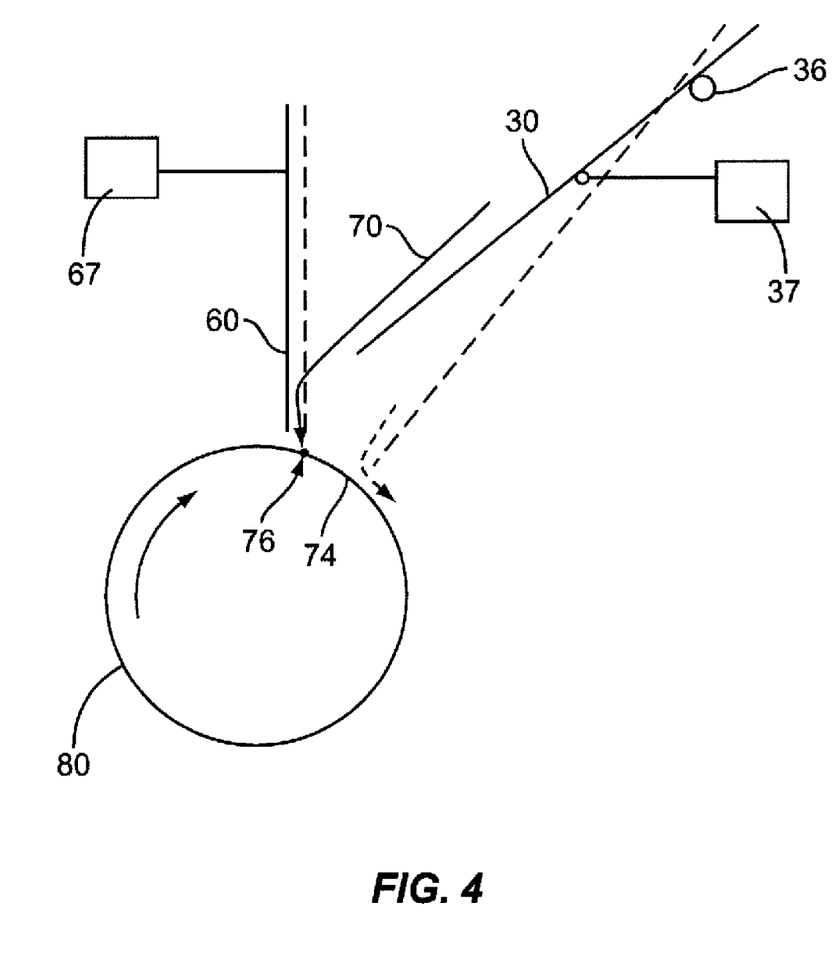
FIG. 4 shows a schematic side view of the device of FIG. 2 with moved positions of the feed chute and redirecting wall shown in dashed lines.

The main chute 30, in general, provides a downwardly inclined surface for supplying wood chips from conveyor system 14 to drum 80. In a simple embodiment, the main chute 30 may be formed by a single baseplate 42 that is pivotally mounted at pivot 36 so that output end 39 of main chute 30 may be readily moved relative to drum 80. While pivot 36 is shown located proximate the input end 38 of the main chute 30 in FIG. 4, it should be understood that pivot 36 may be located at any suitable location. Actuator 37 is coupled to baseplate 42 and acts to control the orientation of baseplate 42, to thereby control the position of baseplate output end 39 relative to drum 80 and/or redirecting wall 60. Thus, actuator 37 may be extended to cause baseplate output end 39 to be in an upper position (solid lines in FIG. 4) such that angle α is relatively larger, or retracted to cause baseplate output end 39 to be in a lower position (represented by dashed lines in FIG. 4) such that angle α is relatively smaller. Thus, the flow path 70 of chips 5 leaving baseplate 42 with the actuator 37 extended is relatively retarded, with respect to the rotational direction of the drum 80, as compared to the flow path 70 when the actuator 37 is retracted. Accordingly, the rotational position where the flow path 70 encounters the drum 80 varies depending on the orientation of the baseplate 42, such as from point 76 (extended) to circumferentially different point 74 (retracted). And, because the position of the baseplate 42 may be dynamically adjusted, this rotational position may be dynamically adjusted. As can be appreciated, side flanges 44 may be advantageously attached to or formed with baseplate 42 for containing the flow of wood chips.

Figure 5:
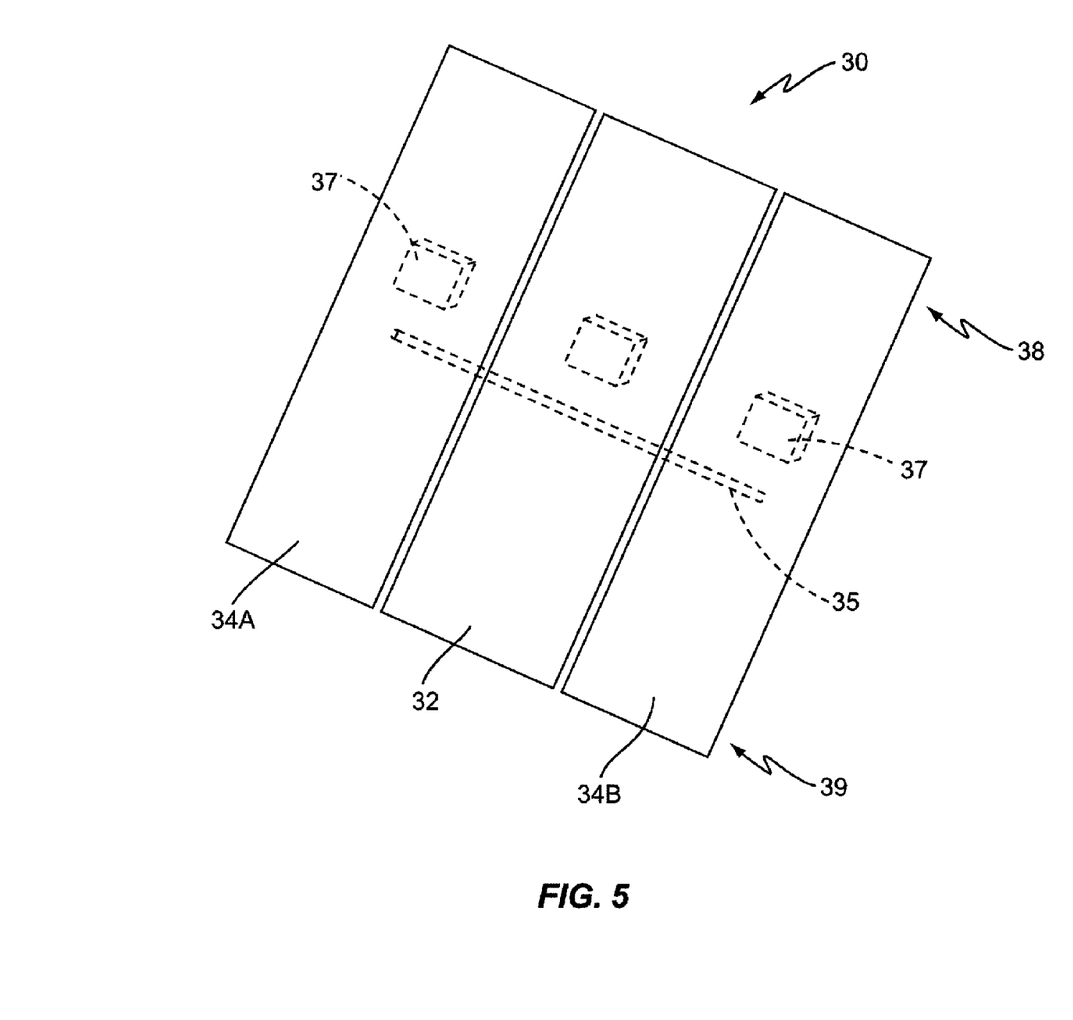
FIG. 5 shows a perspective view of one embodiment of a main chute.

In some embodiments, the main chute 30 may comprise multiple sections that are arranged in parallel from an operational flow perspective. For example, the baseplate 42 may be divided into a center section 32, a left section 34A, and a right section 34B. One or more than one of the sections 32,34A, 34B may be dynamically moveable. For example, each section 32,34A,34B may have its own actuator 37, and therefore be dynamically moveable both with respect to the drum 80 and with respect to the other sections 32,34A,34B. In some embodiments, left and right sections 34A,34B may be coupled together, such as via coupling bracket 35, so as to move together relative to center section 32.

Figure 6:
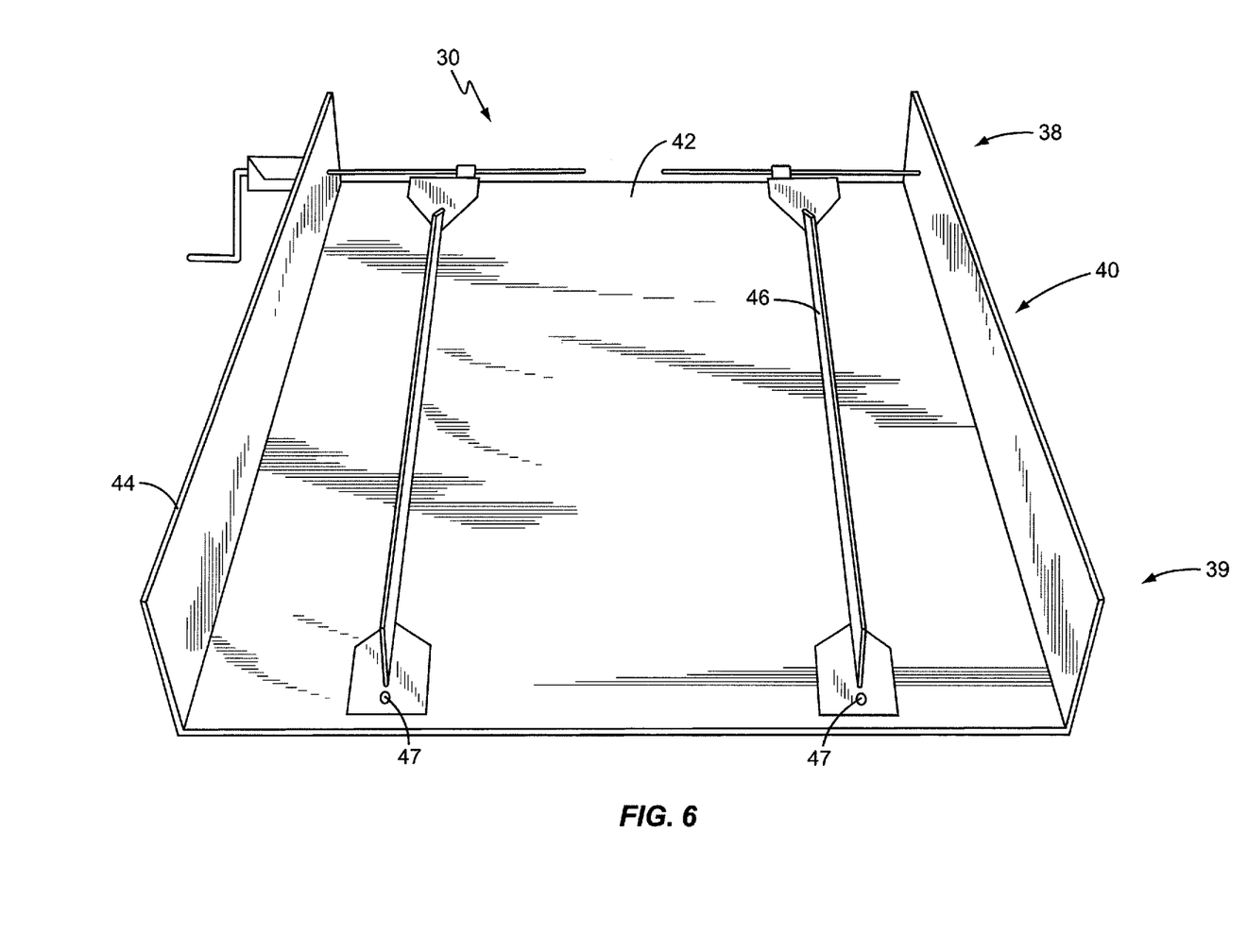
FIG. 6 a perspective view of another embodiment of a main chute with flow dividers.

Advantageously, a portion of the overall flow of wood chips flowing through main chute 30 moves therethrough as distinct parallel process flows. In order to facilitate this, the main chute 30, in some embodiments, may include one or more flow divider walls 46, such as two or three divider walls 46. The flow divider walls 46 may be immovably or moveably attached to corresponding sections 32,34A,34B of main chute 30. Alternatively, the flow divider walls 46 may be disposed upstream of sections 32,34A,34B so as to distribute the wood chips to the various sections 32,34A,34B in a desired fashion. In some embodiments, the flow divider walls 46 may be selectively positioned by pivoting about corresponding pivot points 47 (e.g., shouldered bolts extending through the baseplate 42). The divider walls 46 may be approximately as long as the baseplate 42 (as shown in FIG. 6) or may be shorter if desired. The location of the upper ends of the dividers 46 may be adjusted with respect to the baseplate 42 using a suitable adjusting mechanism. By way of non-limiting example, the adjusting mechanism may take the form of a crank and threaded rod arrangement, or a powered actuator, with suitable pivoting connections between the tops of the dividers 46 and the threaded rods. Of course, other means known in the art may be used to control the orientation of the flow divider walls 46. The purpose of the flow divider walls 46 is to control the flow ratio of the wood chips flowing down main chute 30 to the various the lateral portions of drum 80.

In some embodiments, the lower end of main chute 30 may, if desired, have plates attached thereto in an adjustable fashion. These plates may advantageously be angled slightly upward from the plane of the baseplate 42 so as to act as "kick-up" plates that "kick-up" the flow of chips leaving the main chute 30. The orientation of these plates may be adjustable (dynamically or statically), as is desired.

It is believed that movement of the output end 39 of main chute 30 (closest to drum 80) relatively counter-rotationally to the drum's rotational direction will have the effect of rotating the output pattern (from drum 80) generated by the material coming from the corresponding section(s) of the main chute 30 in a counter-rotational direction, and vice versa. Thus, assume that the drum 80 is rotating clockwise and the main chute 30 is feeding wood chips thereto at a location slightly past top dead center. Moving the output end 39 of the chute counter-rotationally (e.g., pivoting up in FIG. 4) has the effect of shifting the flow path 70 to a more counter-clockwise position relative to the drum 80, i.e., from position 74 to a more retarded position 76. This has the effect of shifting the corresponding output from the drum 80 in a counter-clockwise direction. And, movement of the output end 39 of main chute 30 rotationally forward (e.g., pivoting downward in the FIG. 4) will have the opposite effect. Further, it is believed that changing the flow path 70 so that the flow of chips avoids (or mostly avoids) the redirecting wall 60 (if present) will result in "tightening" of the output angle β of the flung wood chips (from a side view). This tighter spread is believed advantageous for filling the front and rear of railcars 12 with less spillage, and at a greater than freefall packing density, as discussed further below.

The redirecting wall 60 typically acts to redirect the flow of wood chips leaving the main chute 30 down toward the drum 80. The redirecting wall 60 may be either stationary or dynamically moveable, in whole or in part. In one embodiment, the redirecting wall 60 comprises a generally planar plate that is mounted in a stationary generally vertical fashion. In another embodiment, the redirecting wall 60 comprises a generally planar plate that is pivotally mounted at its upper portion so that the lower portion thereof is dynamically moveable relative to drum 80. The movement of such a redirecting wall may be controlled by actuator 67, with, for example, the lower end of wall 60 being rotationally forward when actuator 67 is extended, and rotationally rearward when actuator 67 is retracted. In still other embodiments, the redirecting wall 60 may comprise multiple sections, such as a center section 62 and respective side sections 64A,64B. At least the lower portion of sections 62,64A,64B may be dynamically moved by respective actuators 67. The movement of the sections 62,64A,64B may be linear and/or pivotal; for example, the redirecting wall sections 62,64A,64B may be moved in a fashion similar to the main chute 30 shown in FIG. 5. As with some embodiments of the main chute 30 described above, the various sections 62,64A,64B may be moved independently of each other, or may be coupled together in any configuration as is desired. It should be noted that the center and side sections 62,64A,64B of redirecting wall 60 may be aligned with and correspondingly sized with the corresponding center and side sections 32,34A,34B of main chute 30, or the various sections may be differently sized/aligned as is desired. Just by way of example, the center section 62 of redirecting wall 60 may be wider, the same width as, or narrower than main chute center section 32. Also, while believed advantageous, it is not required that the range of motion of the various redirecting wall sections 62,64A,64B be such that the sections can be aligned with each other in side view.

It is believed that movement of the directing wall sections 62,64A,64B counter-rotationally will have the effect of rotating the corresponding output from the drum 80 counter-rotationally, and vice versa. Thus, again assume that the drum 80 is rotating clockwise and the feed chute assembly 28 is feeding wood chips thereto at a location slightly past top dead center. Moving a redirecting wall section (e.g., 62) "back" has the effect of shifting the corresponding flow path 70 to a more counter-clockwise position relative to the drum, i.e., to a more retarded rotational position (e.g., position 76). This has the effect of shifting the corresponding output pattern from the drum 80 in a counter-clockwise direction. And, movement of the redirecting wall section rotationally forward will have the opposite effect.

It should be understood that in those embodiments where the main chute 30 is dynamically moveable, in whole or in part, the woods chips 5 may not encounter the redirecting wall 60 for all possible positions of the main chute 30. Nevertheless, the flow path 70 of the wood chips should advantageously encounter the redirecting wall 60 for at least some of the possible operating positions. In any case, the lower end of the redirecting wall 60 should be spaced from the drum 80 and/or main chute 30 sufficiently to prevent possible clogging of the device 20 during operation.

The movement of the relevant portions of the feed chute assembly 28 (e.g., main chute sections 32,34A,34B and/or redirecting wall sections 62,64A,64B) allows the output pattern of wood chips flung from the device 20 to be adjusted to have the desired output angle β and direction. For example, depending on the positions of the main chute sections 32,34A,34B and redirecting wall sections 62,64A,64B, the overall output pattern of chips flung from the device 20 may be from about 2:00 to about 10:00 (approximately 240°) or narrowed to be from about 6:00 to about 7:00 (approximately 30°). This ability to tune the output pattern of the device 20 in this manner allows for an expansion/contraction of the output angle β of at least 2:1, and advantageously at least 4:1 or more (such as the about 8:1 ratio in the discussion above). In addition, the exit direction of the output (the center of the exit flow) may be shifted as desired. Such adjustments may be implemented on the overall flow as a unitary group, or may be implemented on a section-wise basis for those embodiments with multi-section main chutes 30 and/or redirecting walls 60. This ability to tune the output of the device 20 allows for greater efficiency when filling containers, such as railcars 12, with less "unpacked" space and/or spillage.

While the exact principles are not fully understood, the handling device 20 of the present invention is able to pack wood chips at density substantially higher than so-called free-fall loading. In free-fall loading, the wood chips from the conveyor system 14 are directed to a pile, in a container or otherwise, via a simple chute system. Examination of free-fall loaded wood chips "packed" in the pile show that they land with widely varying orientations, sometimes referred to as "jack strawed" (like unstacked firewood), resulting in non-optimum density. In contrast, the wood chips loaded via the present device 20 land with a more consistent orientation, resulting in increased density.

The actual packed density achieved is expected to vary depending on variations in size and moisture content of the wood chips. However, a simple ratio, referred to herein as the packing density factor, can be used to quantify the improvement provided by the present invention. The packing density factor is simply the ratio of the weight of wood chips in a given volume when packed with the test device 20 divided by to the weight of the same volume of the same type wood chips (i.e., same size and moisture content), packed using the free-fall method. For instance, it is expected that a common 7100 ft$^3$ railcar loaded with wood chips using the free fall method will have approximately seventy-seven tons of wood chips. Assume that if the same type wood chips are loaded using the device 20 of the present invention, the 7100 ft$^3$ railcar could hold approximately one hundred tons of wood chips. Using these values, the packing density factor would be 100/77=1.30. Clearly, substantial improvements in packing may be achieved using the present device 20, with resulting packing density factors in the range of 1.20 to 1.35 or higher. For reference, these type of packing density factors typically correspond to densities of 26.0 pounds/ft$^3$ to 29.3 pounds/ft$^3$ or more.

The increase in packing density readily achieved by the present invention has clear benefits to the industry. In the simplest terms, more wood chips can be packed into a smaller space, thereby lowering transportation, storage, and processing costs. Further, given the substantial increase in packing density achieved, the cost savings can be considerable. Of course, under some circumstances, the additional packing density provided by use of the present flinger 20 may cause certain containers to be become overweight and/or unbalanced. Care should be taken to prevent this, such as by using suitable scales, fill-level controls, or other load control measures.

The handling device 20 may be used to load wood chips, and particularly uniformly-sized paper making wood chips, into a pile, either on the ground or in a suitable container. Representative examples of suitable containers include railcars 12, ships, barges, trailers, storage bins, and process containers such as digestion chambers.

In an exemplary method, using a railcar 12 as an illustrative example of a container, the device 20 is mounted to the tower 16 of loading station 10. The railcar 12 is positioned below the handling device 20, and motor 24 is started to start the drum 80 rotating. When the drum 80 is spinning properly, wood chips are supplied to the feed chute assembly 28 by conveyor system 14. The wood chips travel through main chute 30, and impact against redirecting wall 60 where they are redirected to fall toward drum 80. The wood chips are then flung by the blades 100 of the spinning drum 80. During the filling of the railcar 12, the angular output of the device 20 may be shifted forward or backward by dynamically moving portions of the main chute 30 and/or redirecting wall 60. In addition, the angular output of the device (in side view) may be tightened or widened in the same fashion. Further, adjustments to the output may be achieved by adjusting the rotational speed of the drum and/or the flow balance in the feed chute assembly 28 (via movement of flow divider walls 46), as is desired. Thus, the output of the device 20 may be advantageously shifted rearward and tightened when initially filling the front of the railcar 12, then shifted to a more normal position and spread out for the main portion of the railcar 12, then tightened and shifted frontward for the rear of the railcar 12. Other spreading/shifting approaches may also be taken to tune the filing process depending on the particular conditions encountered. As can be appreciated, the relevant dynamic adjustments may be manually controlled or advantageously computer controlled, as is desired.

In some embodiments, splatter shields and additional diverter vanes may be disposed downstream of the drum, if desired. Such splatter shields may, if desired, be dynamically moveable in order to help minimize splatter and/or increase packing of the material. In addition, some form of oscillating movement may be advantageous, such as to create layers of deposited material. Further, it may be advantageous to configure the feed chute assembly 28, and position the same with respect to drum 80, so that the wood chips will continue to flow even in the event of power loss, so as to avoid clogging situations that are time-consuming to remedy. Thus, it may be advantageous to allow the drum 80 to free wheel spin when not being powered by motor 24.

The discussion above has sometimes been in terms of the output end 39 of the main chute 30 being dynamically displaced by pivoting the relevant section of main chute, and/or in terms of the output end of redirecting wall 60 being dynamically displaced by pivoting the relevant section of redirecting wall 60. However, it should be understood that motions other than pivoting may be employed. For example, the redirecting wall may be translated forward/backward without rotation thereof, using rollers or other guides, scissor links, or the like in combination with actuator 67. A similar approach may be taken with respect to raising/lowering main chute 30 without changing its angular orientation with respect to vertical, if desired. And/or both rotational and translational movement may be used to displace the relevant element.

While the invention has been illustrated and described in detail in the drawings and foregoing description, the same is to be considered as illustrative and not restrictive in character, it being understood that only some embodiments have been shown and described and that all changes and modifications that come within the meaning and equivalency range of the appended claims are intended to be embraced therein.

What is claimed is:

1. A method of forming a stack of wood chips with increased density, the method comprising:

feeding a supply of wood chips to a rotating drum via a feed chute assembly;

said drum rotating about a generally horizontal longitudinal axis and comprising a central core and at least first and second outwardly extending blades circumferentially spaced from one another;

said feed chute assembly comprising a downwardly angled main chute and a redirecting wall; said redirecting wall disposed downstream of said main chute, upstream of said drum, and disposed at an angle to said main chute;

changing an output pattern of said wood chips flung from said drum by moving at least a portion of at least one of said main chute and said redirecting wall from a first position to a second position while said drum is rotating and said wood chips are being fed to said drum;

said moving causing an associated flow of wood chips to be directed at said drum at a different rotational position.

2. The method of claim 1 wherein said moving comprises moving at least a portion of said feed chute.

3. The method of claim 2 wherein said main chute comprises a plurality of sections disposed parallel flow-wise; wherein said moving comprises moving a first of said sections relative to said drum and another of said sections.

4. The method of claim 1 wherein said changing said output pattern comprises widening an angular sweep of said output pattern, in a side view along said axis, and thereafter adjusting said output pattern by moving said at least a portion from said second position to said first position while said drum is rotating and said wood chips are being fed to said drum.

5. The method of claim 1 wherein said changing said output pattern comprises moving at least a portion of both said main chute and said redirecting wall while said drum is rotating and said wood chips are being fed to said drum.

6. The method of claim 1 wherein moving at least a portion of at least one of said main chute and said directing wall from a first position to a second position while said drum is rotating and said wood chips are being fed to said drum comprises pivotally moving said portion while said drum is rotating and said wood chips are being fed to said drum.

7. The method of claim 1 wherein said moving causes an angular sweep, in side view, of said wood chips flung by said drum to change by at least 50%.

8. The method of claim 7 wherein said moving causes said angular sweep to narrow by at least 75%.

* * * * *